(12) United States Patent
Danilov

(10) Patent No.: US 10,983,876 B2
(45) Date of Patent: Apr. 20, 2021

(54) NODE MANAGEMENT OF PENDING AND UNSTABLE OPERATIONS

(71) Applicant: Seagate Technology LLC, Cupertino, CA (US)

(72) Inventor: Nikita Danilov, Moscow (RU)

(73) Assignee: Seagate Technology LLC, Fremont, CA (US)

( * ) Notice: Subject to any disclaimer, the term of this patent is extended or adjusted under 35 U.S.C. 154(b) by 155 days.

(21) Appl. No.: 16/165,636

(22) Filed: Oct. 19, 2018

(65) Prior Publication Data

US 2019/0303254 A1 Oct. 3, 2019

(30) Foreign Application Priority Data

Mar. 29, 2018 (RU) .......................... RU2018111212

(51) Int. Cl.
*G06F 11/00* (2006.01)
*G06F 11/14* (2006.01)
*G06F 11/20* (2006.01)
*G06F 9/48* (2006.01)

(52) U.S. Cl.
CPC .......... *G06F 11/1474* (2013.01); *G06F 9/485* (2013.01); *G06F 9/4856* (2013.01); *G06F 11/1471* (2013.01); *G06F 11/2023* (2013.01); *G06F 2201/805* (2013.01)

(58) Field of Classification Search
CPC .. G06F 11/14; G06F 11/1402; G06F 11/1471; G06F 11/1474
See application file for complete search history.

(56) References Cited

U.S. PATENT DOCUMENTS

| 5,287,501 | A | 2/1994 | Lomet |
| 5,931,955 | A | 8/1999 | Kung |
| 8,108,356 | B2 | 1/2012 | Whang et al. |
| 8,495,338 | B2 | 7/2013 | Jeddeloh |
| 9,086,911 | B2 | 7/2015 | Mitchell et al. |
| 9,747,222 | B1* | 8/2017 | Armangau ............ G06F 12/124 |
| 10,229,011 | B2* | 3/2019 | Leshinsky ............. G06F 3/0619 |
| 2010/0169284 | A1* | 7/2010 | Walter ................. G06F 11/1474 707/682 |
| 2011/0137874 | A1* | 6/2011 | Grosman ............ G06F 16/2322 707/688 |
| 2012/0117421 | A1* | 5/2012 | Craft ................... G06F 11/1469 714/15 |
| 2017/0272539 | A1* | 9/2017 | Wozniak ............. G06F 16/2455 |
| 2018/0232412 | A1* | 8/2018 | Bensberg ............ G06F 11/1464 |

* cited by examiner

*Primary Examiner* — Michael Maskulinski
(74) *Attorney, Agent, or Firm* — Mueting Raasch Group

(57) ABSTRACT

A system including a plurality of nodes. Each node includes a pending operations list, an unstable operations list, and a hardware controller. The pending operations list can include operations that have not yet been executed on the node. The unstable operations list can include operations that have not yet been stored on non-volatile data storage. Each of the operations listed in the unstable operations list can include a listing of all other operations that must be executed prior to the operation being executed on each respective node. The hardware controller can be configured to execute at least one operation listed in the pending operations list, remove at least one executed operation from the pending operations list, and remove at least one operation from the unstable operations list.

30 Claims, 13 Drawing Sheets

NODE MANAGEMENT OF PENDING AND UNSTABLE OPERATIONS

CROSS REFERENCE TO RELATED APPLICATIONS

This application claims the benefit of priority under 35 U.S.C. § 119(a) of RU Application No. 2018111212 filed Mar. 29, 2018, the disclosure of which is incorporated by reference herein in its entirety.

The present disclosure relates to data systems. In particular, the present disclosure relates to executing operations without deleting any of the updated operations even if a node in the data system has failed.

SUMMARY

Various embodiments of the present disclosure relate to executing operations. The operations can be executed without deleting any previously performed or executed operations even if a node in the data storage system has failed. An operation can be executed in response to all operations on which the operation depends already being executed. This mechanism may be used in a system for data storage, which may include nodes, devices, or other storage components that can fail.

In at least one embodiment, an exemplary system can include a plurality of nodes. Each of the plurality of nodes can include a pending operations list including operations that have not yet been executed on the node. Each of the plurality of nodes can include an unstable operations list including operations that have not yet been stored on non-volatile data storage. Each of the operations listed in the unstable operations list can include a listing of all other operations that must be executed prior to the operation being executed on each respective node. Each of the plurality of nodes can include a controller (e.g., a hardware controller) including one or more processors. Each hardware controller can be configured to execute at least one operation listed in the pending operations list in response to all other operations that the at least one operation depends on being executed. Each hardware controller can be configured to remove the at least one executed operation from the pending operations list in response to the execution of the at least one operation. Each hardware controller can be configured to remove at least one operation from the unstable operations list in response to storage of the at least one operation from the unstable operations list on non-volatile data storage.

In at least one embodiment, an exemplary method can include providing a pending operations list including operations that have not yet been executed on the node. The method can include providing an unstable operations list including operations that have not yet been stored on non-volatile data storage. Each of the operations listed in the unstable operations list can include a listing of all other operations that must be executed prior to the operation being executed on each respective node. In response to a first node of the plurality of nodes experiencing node failure, a hardware controller of the first node can receive data from the unstable operations list of a second node of the plurality of nodes. In response to the first node experiencing the node failure, the hardware controller of the first node can repopulate the pending operations list of the first node with the data from the unstable operations list of the second node.

In at least one embodiment, an exemplary apparatus can include a plurality of nodes. Each of the plurality of nodes can include a pending operations list including operations that have not yet been executed on the node. Each of the plurality of nodes can include an unstable operations list including operations that have not yet been stored on non-volatile data storage. Each of the operations listed in the unstable operations list comprises a listing of all other of the operations that must be executed prior to the operation being executed. Each of the plurality of nodes can include a hardware controller including one or more processors. A first hardware controller of a first node of the plurality of nodes can be configured to store an unstable operations list indicating which operations have not been stored in non-volatile memory. The first hardware controller can be configured to send the operations in the unstable operations list to a second node of the plurality of nodes that has failed. A second hardware controller of a second node of the plurality of nodes can be configured to receive the operations from the unstable operations list of the first node. The second hardware controller can be configured to store the operations in the pending operations list of the second node.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
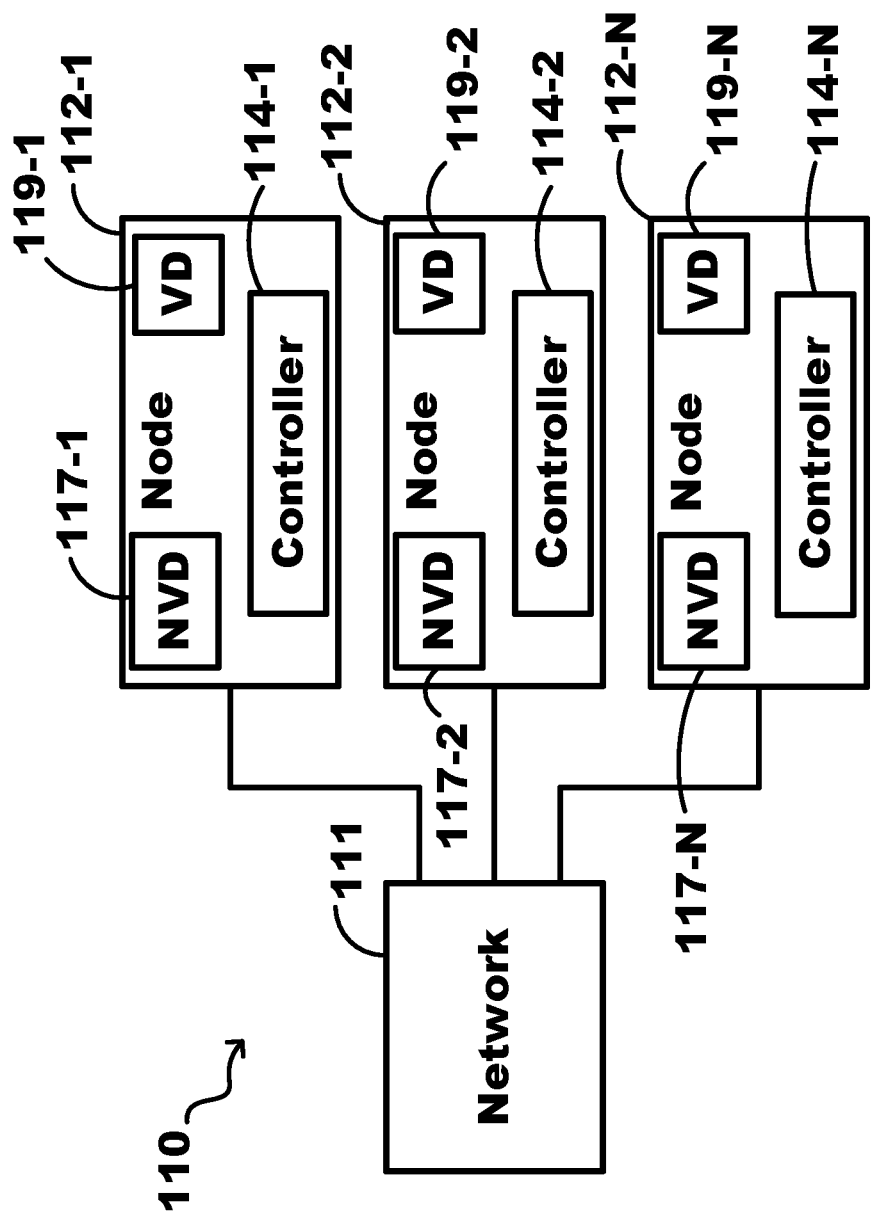
FIG. 1 is a block diagram of an example system for operations in accordance with embodiments of the present disclosure.

The present disclosure relates to systems, methods, and processes for executing operations for storage in data storage devices, such as cloud storage systems, servers, hard drives, etc. Although reference is made herein to nodes, devices, and storage devices, data may be stored in any suitable data storage system with available storage space that stores data on different devices or nodes. Non-limiting examples of data storage devices include non-volatile and volatile memory, hard disk drives, solid state drives, and multilayer drives (for example, utilizing both hard disk and solid state). Various other applications will become apparent to one of skill in the art having the benefit of the present disclosure.

In many data storage systems, it can be beneficial to execute updates to an operation and monitor which updates have been executed on a node and which updates have been stored to non-volatile memory. As an example, a distributed system, including a number of services, running on nodes in communication through a network can be used. Each of a plurality of nodes can include a volatile data storage device, which may lose its data in the case of a node or service failure associated with that node. In at least one example, at least one node includes a non-volatile data storage device (e.g., persistent memory storage), which may not lose its data in the case of a node or service failure.

Together, the services can maintain a distributed system state, stored in the volatile and the non-volatile storage devices. This state can be modified, by means of operations, and monitored via queries sent by services to each other across the network. An operation can include updating stored data on multiple nodes. Data stored on different nodes can be compared to one another using something referred to as a global state consistency invariant. In at least one example, an operation is transactional, meaning the global state consistency invariant is maintained even if a failure occurs. To accomplish this, either all or none of updates associated with a particular operation should be present in the system state. In addition, in the case of a first operation that depends on a second operation, if the first operation survives a failure, the second operation should also survive the failure. The figures below describe a system for achieving the all or none and dependent operation survival in a way that is independent of particular details of operations and independent of the "depends upon" relationship between operations. A transaction can include a plurality of operations and each operation can depend on other operations that are within a transaction. That is, a first operation within a first transaction can depend on a second operation within a second transaction. In this example, the first operation can be described as depending on the second transaction (or, more specifically, depending on the second operation within the second transaction).

In at least one example, an operation can be represented by an object R, such that for a range of indices, R.update[i] is a representation of an $i^{th}$ update to the operation R. In some embodiments, the present invention can be implemented in an object based distributed storage system or networked file system. R.update[i].node can be an identity of a node on which the $i^{th}$ update should be executed. A node with an identity R.update[i].node can invoke an R.update[i] .apply( ) to execute the update on a precondition that for all operations on which R depends, all of their updates for this node have already been executed. This precondition can be verified by R.update[i].ready( ). R.node can stand for an identity of a node where R originates. In this way, an operation R can be sent to a node and the node can verify that operations (e.g., operation updates) on which operation R depend have already been executed.

An operation can be referred to as stable if data of the operation would survive a node failure. Each node (e.g., service S on the node) can maintain a set S.unstable of operations that are not yet stable that other services are yet to execute. In at least one example, operations listed in S.unstable can be marked once the operations are stored in non-volatile memory. The marked operations can be removed from the S.unstable list. In at least one example, operations listed in S.unstable can be removed once the operations are stored in non-volatile memory. Further, each node (e.g., service S on the node) can maintain a set of S.pending of operations that have been received for execution but have not been executed by the node yet. In this way, each operation to be executed can be removed from the S.pending list once the operation is executed. Each operation can be removed from the S.unstable list once the operation is stored in non-volatile memory. This allows the system to monitor the flow of operations and their executions and, in the event of a node failure, repopulate whichever node has failed with the S.unstable list so the node can determine which operations to redo. While S.pending and S.unstable are examples of lists that could be used, examples are not so limited. That is, additional examples using other lists that accomplish a similar purpose that would be understood by those skilled in the art may also be used.

FIG. 1 shows a block diagram of a system 110 for operations in accordance with embodiments of the present disclosure. The system 110 can include a network 111 in communication with a number of nodes 112-1, 112-2, . . . , 112-N (hereinafter referred to collectively as nodes 112). The nodes 112 can each include a corresponding controller 114-1, 114-2, . . . , 114-N (e.g., a hardware controller, hereinafter referred to collectively as controllers 114). The controllers 114 can include a central processing unit (CPU), computer, logic array, or other device capable of directing data coming into or out of the system 110. The CPU of the controllers 114 may include any one or more of a microprocessor, a controller, a microcontroller, a digital signal processor (DSP), an application specific integrated circuit (ASIC), a field-programmable gate array (FPGA), and/or equivalent discrete or integrated logic circuitry.

In some examples, the processor may include multiple components, such as any combination of one or more microprocessors, one or more controllers, one or more DSPs, one or more ASICs, and/or one or more FPGAs, as well as other discrete or integrated logic circuitry. The functions attributed to the controller or processor herein may be embodied as software, firmware, hardware, or any combination thereof. While described herein as a processor-based system, an alternative controller could utilize other components such as relays and timers to achieve the desired results, either alone or in combination with a microprocessor-based system. In at least one embodiment, the system 110 can include a host device (not illustrated) in communication with at least one of the controllers 114. In some embodiments, the controllers 114 may each include one or more computing devices having memory, processing, and communication hardware. The functions of each of the controllers 114 may be performed by hardware and/or as computer instructions on a non-transient computer readable storage medium.

The nodes 112 can each include corresponding non-volatile data storage ("NVD") 117-1, 117-2, . . . , 117-N (hereinafter referred to collectively as NVD 117). The nodes 112 can each include corresponding volatile data storage ("VD") 119-1, 119-2, . . . , 119-N (hereinafter referred to collectively as VD 117). Non-volatile data storage can refer to any storage in which the data is persistently stored. Persistently stored can refer to data that persists even if a failure is experienced. That is, if a node storing data in non-volatile data storage (such as NVD 117) experiences a failure, the stored data is not lost. In contrast, volatile data storage can refer to data that is no persistently stored and would be lost due to a node failure. While volatile and non-volatile data storage is described in this example, examples are not so limited. Any number of different types of memories can be used for a similar purpose and will be appreciated by those skilled in the art. As an example, the NVD 117 can alternatively be any form of persistent, or nonvolatile, memory. Further, the VD 119 can be any form of non-persistent, or volatile, memory.

In at least one embodiment, the NVD 117 and/or the VD 119 can be located external to the nodes 112 and be in communication with the nodes 112, although not illustrated in FIG. 1. While the example illustrates the nodes 112 each including a respective controller 114, examples are not so limited. That is, in at least one example, the controllers 114 can each be external to their respective nodes 112 and be in communication with their respective nodes 112. The nodes 112 can refer to devices or system locations on a larger network, such as network 111. The devices can include computers, cell phones, printers, processors, etc. and in some examples can be associated with an identifier (e.g., such as an internet protocol (IP) address). Further, although a single node is described, it is to be understood that the system may include more than one node.

Each of the data storage apparatuses including the NVDs 117 and/or the VDs 119 may include any device and/or apparatus configured to store data (for example, binary data, etc.). The data storage apparatuses can include, but are not necessarily limited to, solid state memory, hard magnetic discs, magnetic tapes, optical discs, integrated circuits, and any combination thereof. Further, each data storage apparatus may be an array of storage devices such as, for example, a RAID (redundant array of inexpensive disks) storage arrangement. Each data storage apparatus may be a server or virtual server. It is to be understood that this disclosure is not limited to the system 110 depicted in FIG. 1, and, instead, the system 110 is only one exemplary configuration. For example, system 110 may include one or more of a local filesystem, a storage area network (SAN) file system, a distributed file system, a parallel file system, a virtual file system, and/or combinations thereof. In various embodiments, each data storage apparatus may be described as a storage device. In some further embodiments, each data storage apparatus may be described as a node, each of which may include a plurality of storage devices.

The controllers 114 can each be configured to provide the reading and writing of one or more portions of data from and/or to the NVDs 117 and/or the VDs 119. As an example, a controller 114-1 read data stored in a VD 119-1 and write it to an NVD 117-1 to persistently store the data. Further, the VDs 119 can be used to store operations yet to be executed. The NVDs 117 can be used to store operations that have been executed on all nodes that the operations are to be executed on.

In one or more embodiments, the exemplary systems, nodes, apparatuses, and methods may be implemented using one or more computer programs using a computing apparatus, which may include one or more processors and/or memory. Program code and/or logic described herein may be applied to input data/information to perform functionality described herein and generate desired output data/information. The output data/information may be applied as an input to one or more other nodes and/or methods as described herein or as would be applied in a known fashion. In view of the above, it will be readily apparent that the controller functionality as described herein may be implemented in any manner known to one skilled in the art.

In at least one embodiment, a node can experience a failure. Such failures may be tracked by the system 110. For example, when a node fails, the units associated with the node may be tracked as failed units. This known failure information may be updated in response to detecting a new failure. The known failure information may be used in various ways to store and retrieve information. In some embodiments, the node that failed may be identified and data associated with the node failure (e.g., operations to be executed that are lost during the failure) may be recovered through additional methods, as described below. In such embodiments, the operations that are yet to be executed and persistently stored in non-volatile data storage can be determined. That is, operations that have been executed in volatile data storage, but have not been stored to non-volatile storage, may be lost during a node failure. Those lost operations may be determined and then redone, or executed again, in response to the node failure that caused a loss of the data associated with execution of that operation.

To address the situation where the executed operations in VDs 119 are lost during a node failure, additional nodes can provide the lost data to be executed. As an example, if node 112-1 experiences a failure and loses operations executed and stored in VD 119-1, additional nodes such as nodes 112-2 and 112-N can provide node 112-1 with data associated with the lost executed operations. Node 112-1 can then redo those operations. In addition, as described below, as operations are not executed until additional transactions that the operation depends on have had their respective operations executed, no executed operations will be deleted. Deletion of the operations may occur during the node failure and therefore the operations can be redone but no operations that the executed operations depend on or that depend on the executed operation will need to be deleted in response to the failure.

Figure 2:
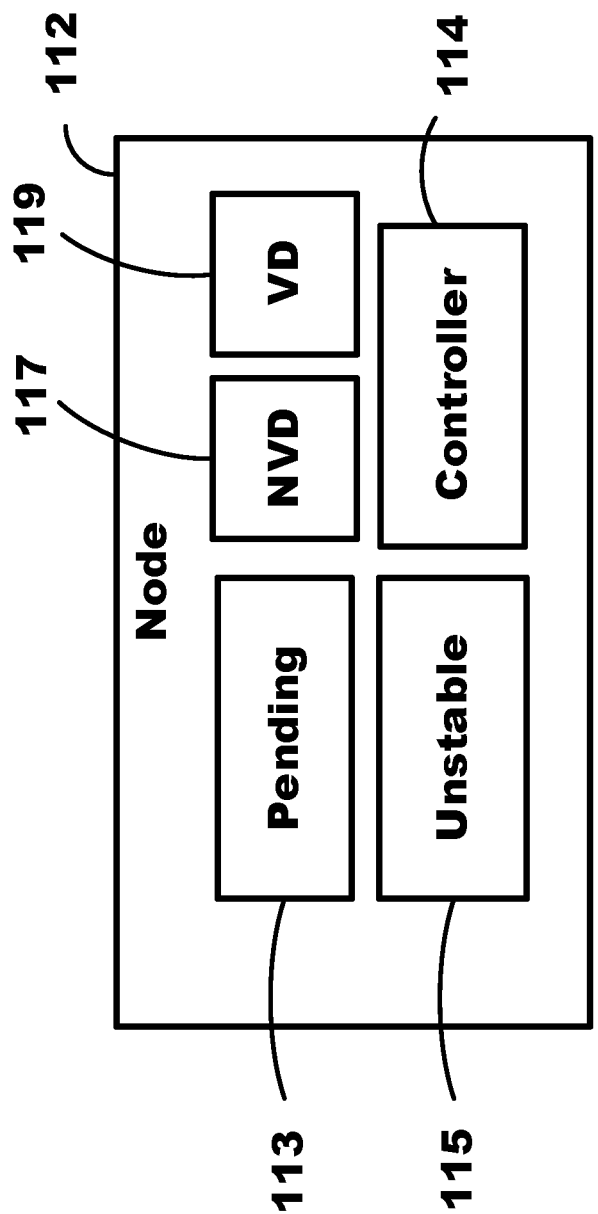
FIG. 2 is a block diagram of an example node for operations in accordance with embodiments of the present disclosure.

FIG. 2 is a block diagram of an example node 112 for operations in accordance with embodiments of the present disclosure similar to as shown in FIG. 1. The node 112 can include a controller 114, non-volatile data storage ("NVD") 117, and volatile data storage ("VD") 119. As shown in FIG. 2, the node 112 can further include a pending operations list 113 and an unstable list 115. The pending operations list 113 can store a list of operations that are yet to be executed on the node 112. The pending operations list 113 can be lost during a node failure and can be repopulated with a list of operations to be executed provided by an additional node that has not failed. The unstable list 115 can store a list of operations that are yet to be stored in persistent, or non-volatile, data storage such as NVD 117 of this node or NVD 117 of any other node. As each operation listed in the unstable list 115 is stored to NVD 117, the operation can be removed from the unstable list 115. In response to a node 112 receiving a list of operations to be executed, the node 112 can add the received operations to the pending operations list 113 and the unstable list 115 in order to verify that the received operations have been executed and subsequently stored in NVD 117. In at least one embodiment, each of the nodes 112 illustrated in FIG. 1 can include the elements designated in FIG. 2.

Figure 3A:
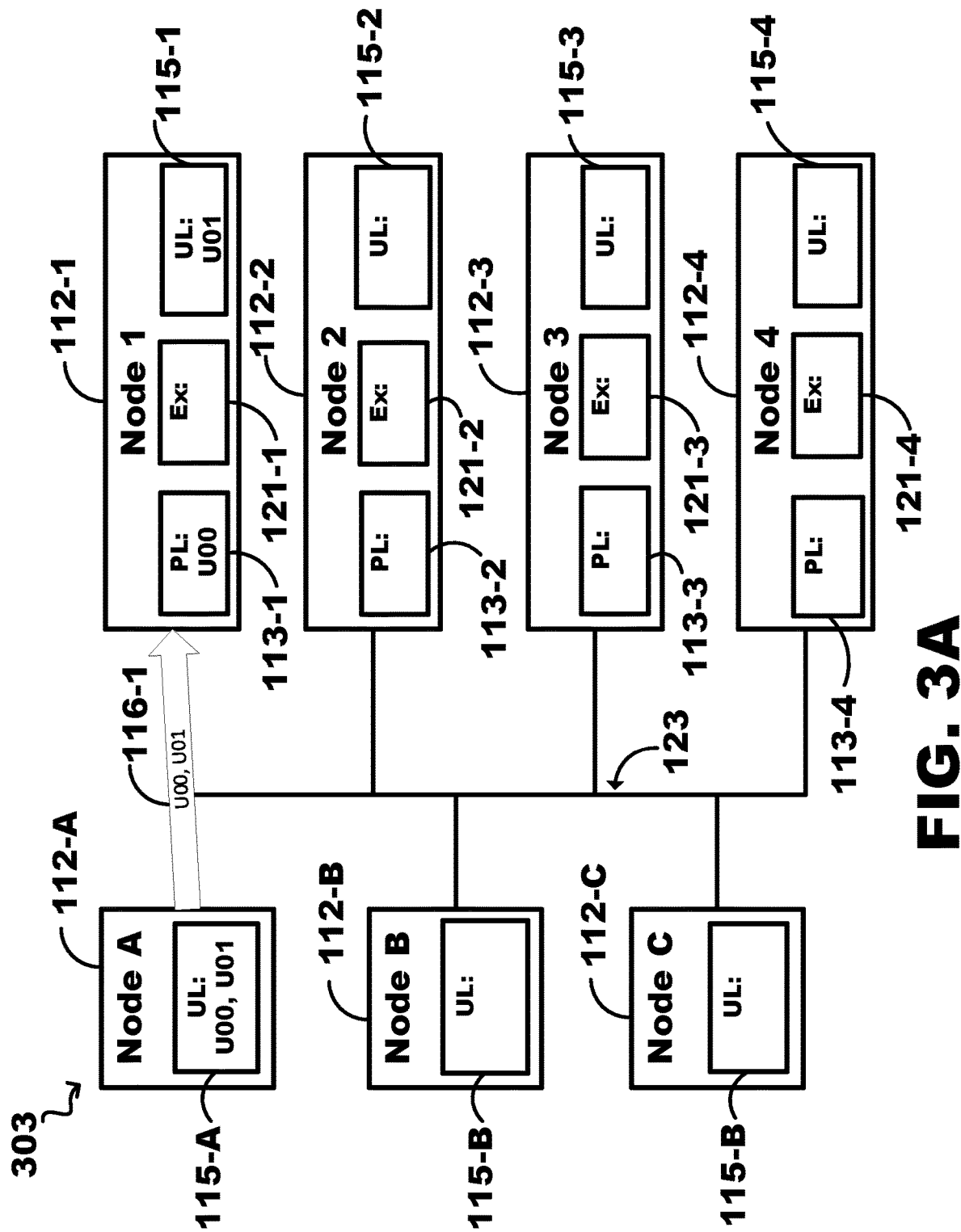
FIGS. 3A-3I are block diagrams of an example system for operations in accordance with embodiments of the present disclosure.
Figure 3B:
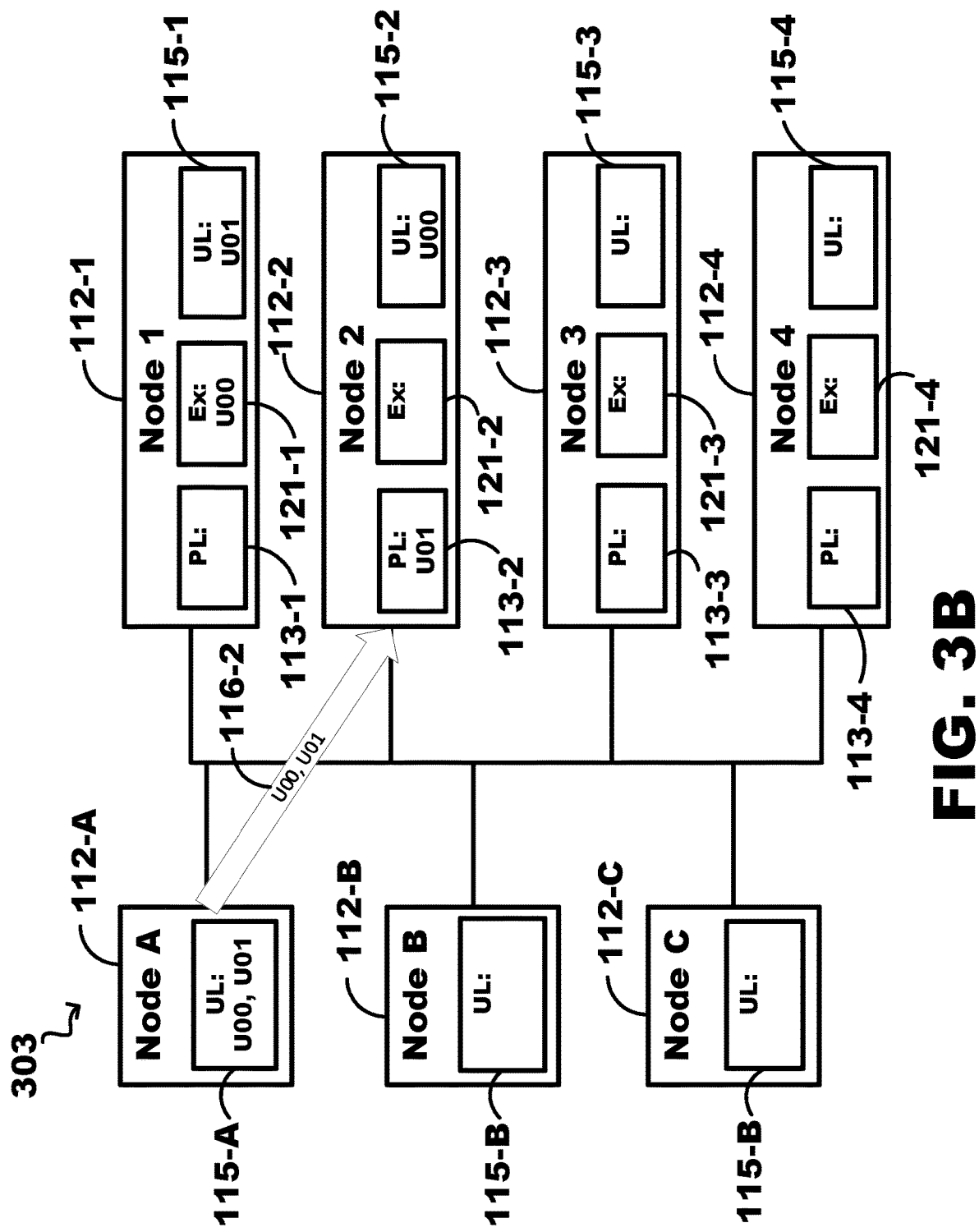
Figure 3C:
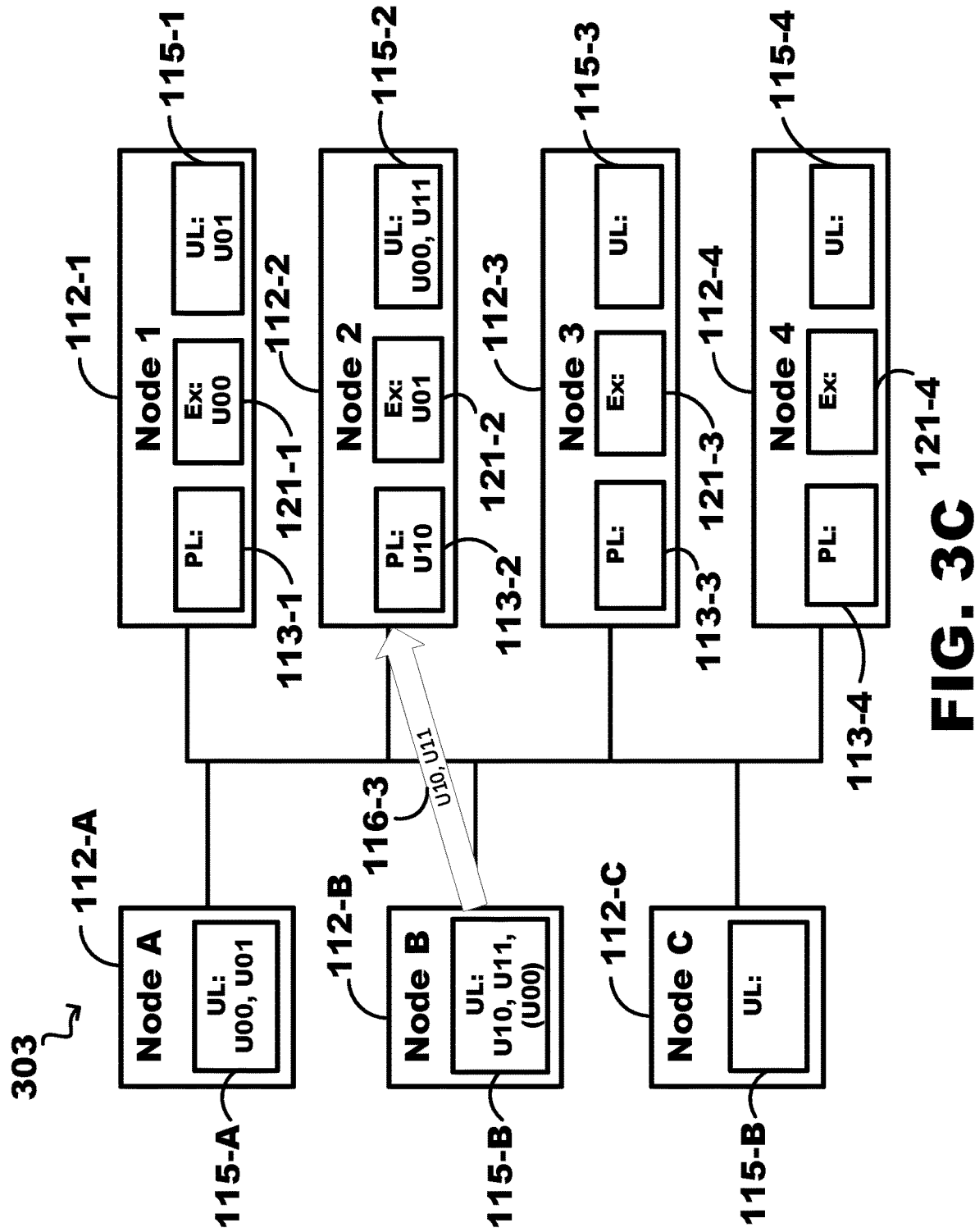
Figure 3D:
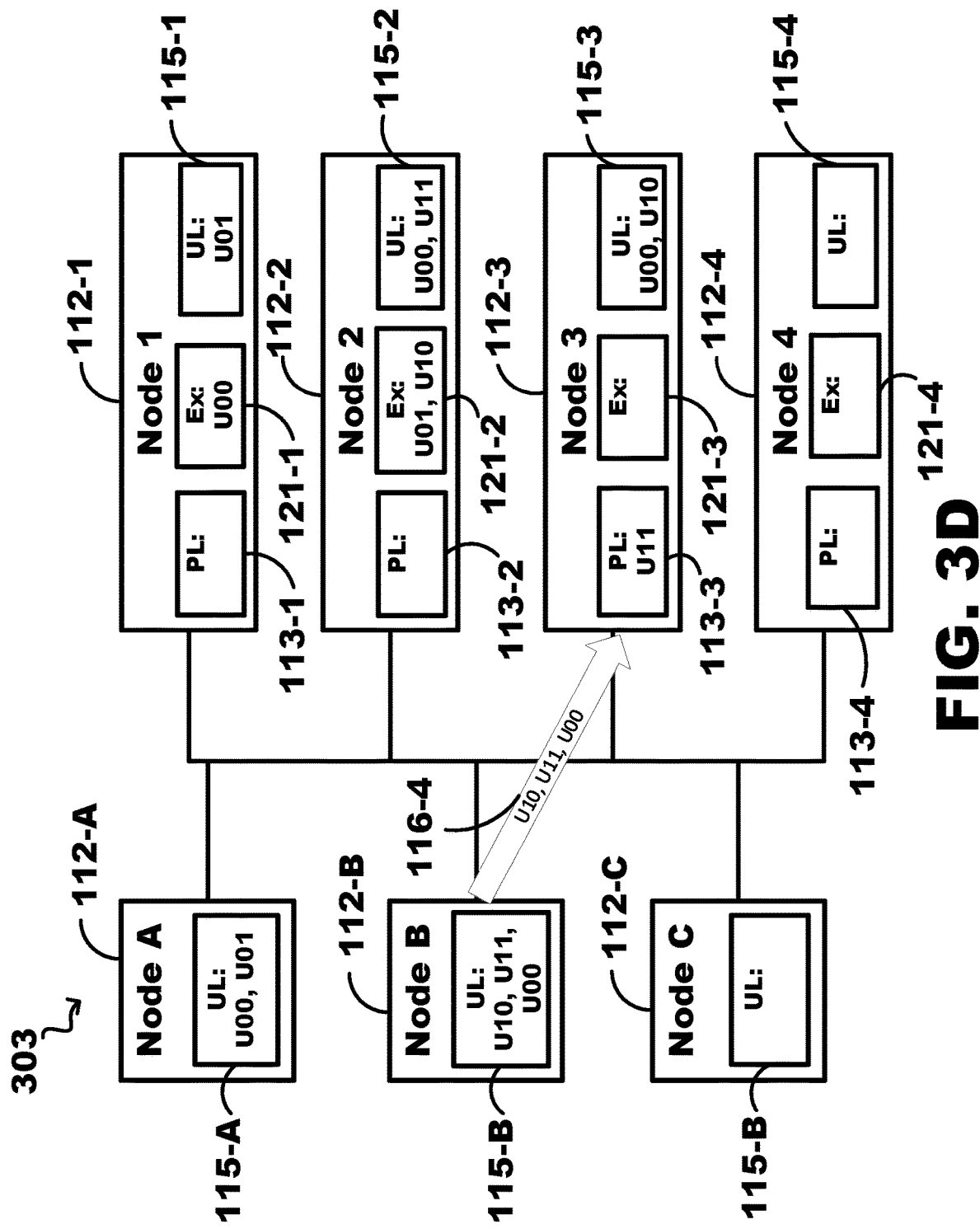
Figure 3E:
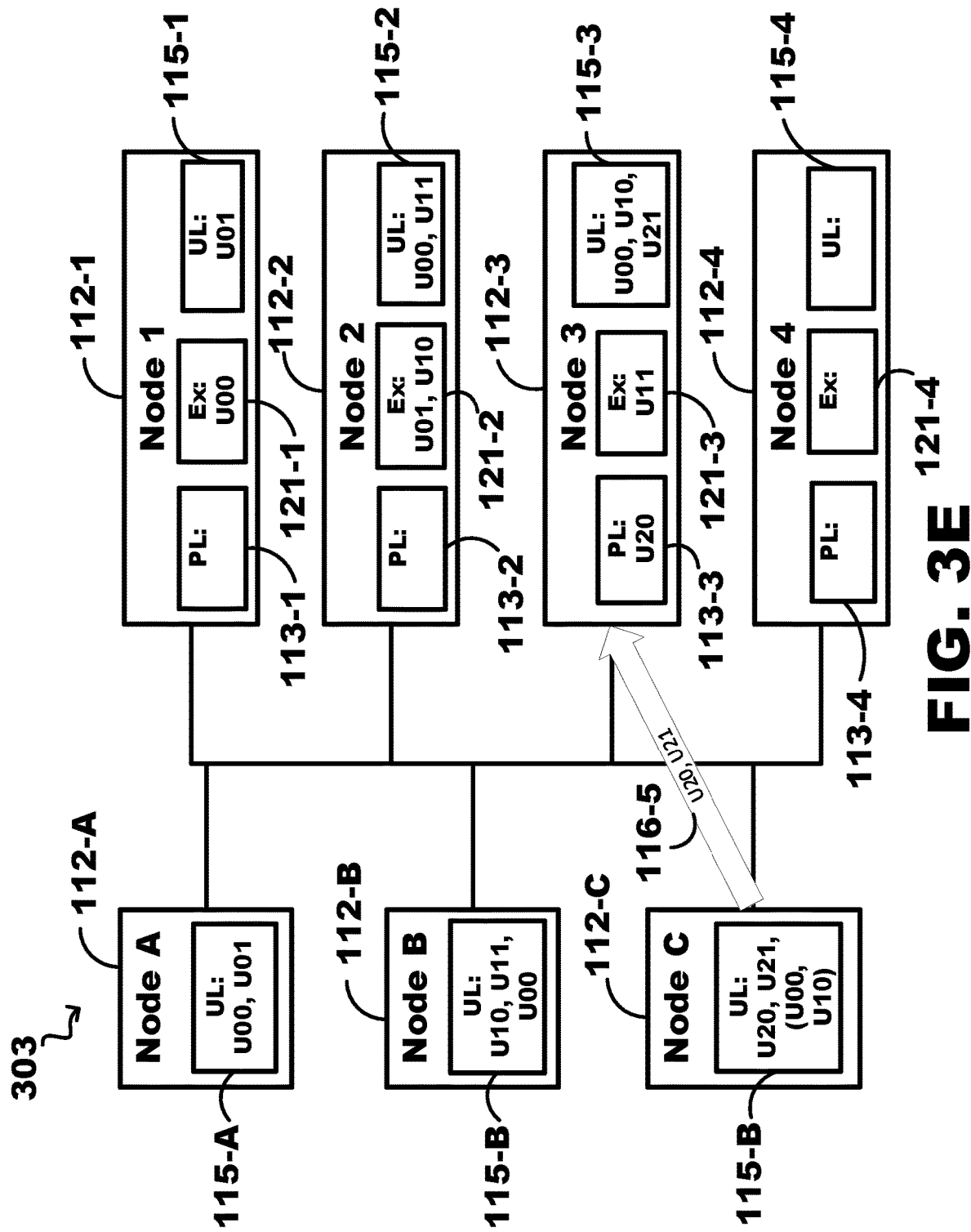
Figure 3F:
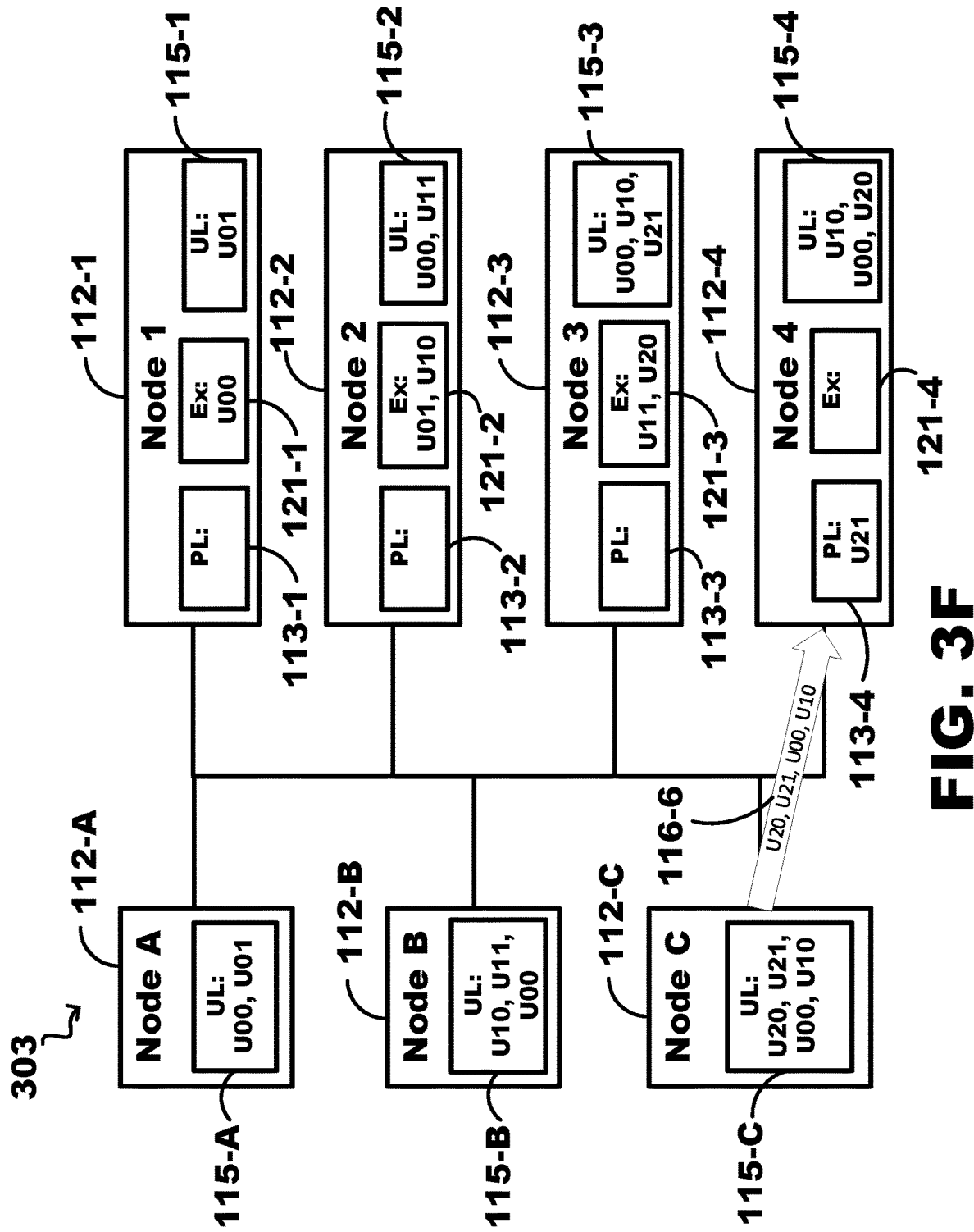
Figure 3G:
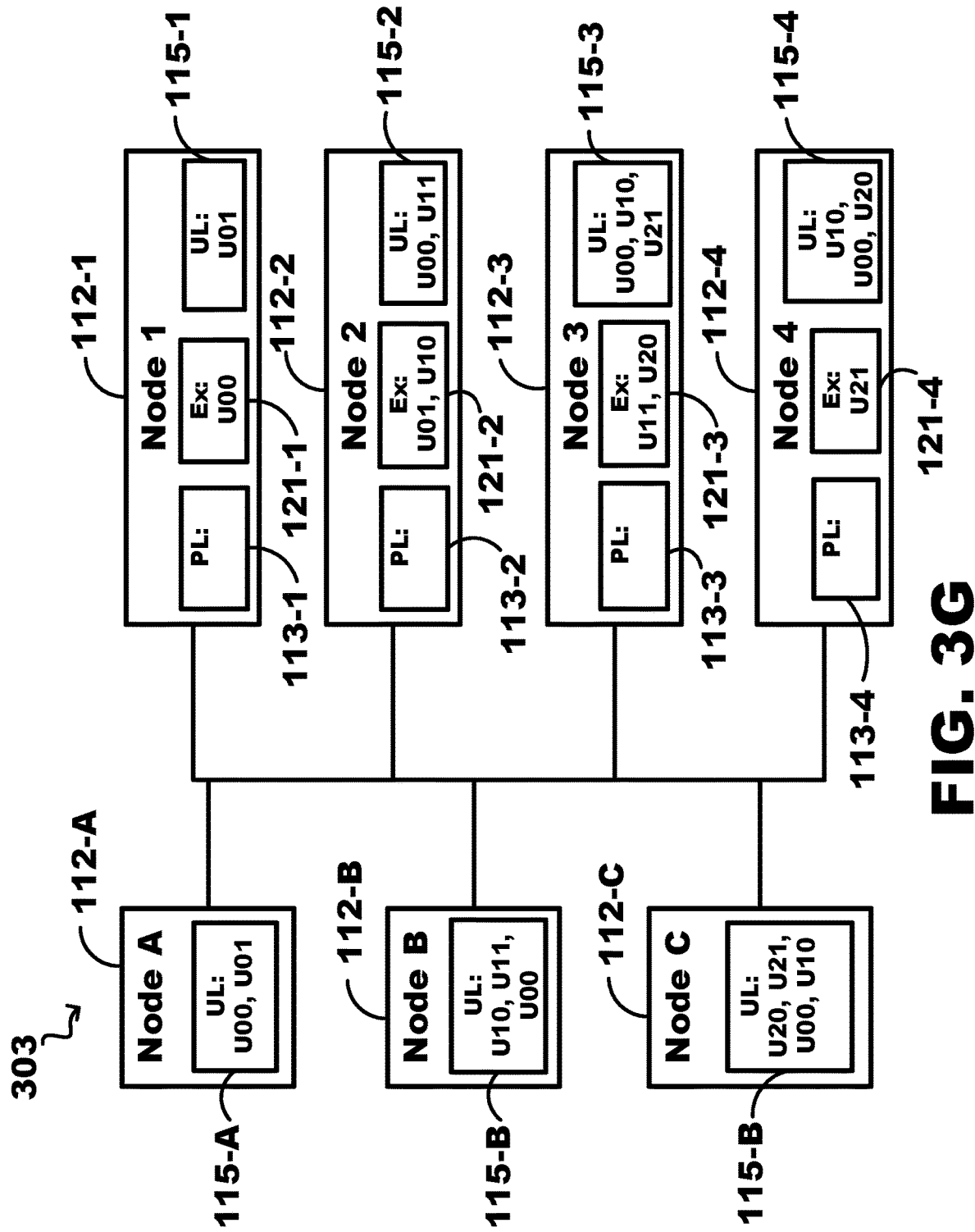
Figure 3H:
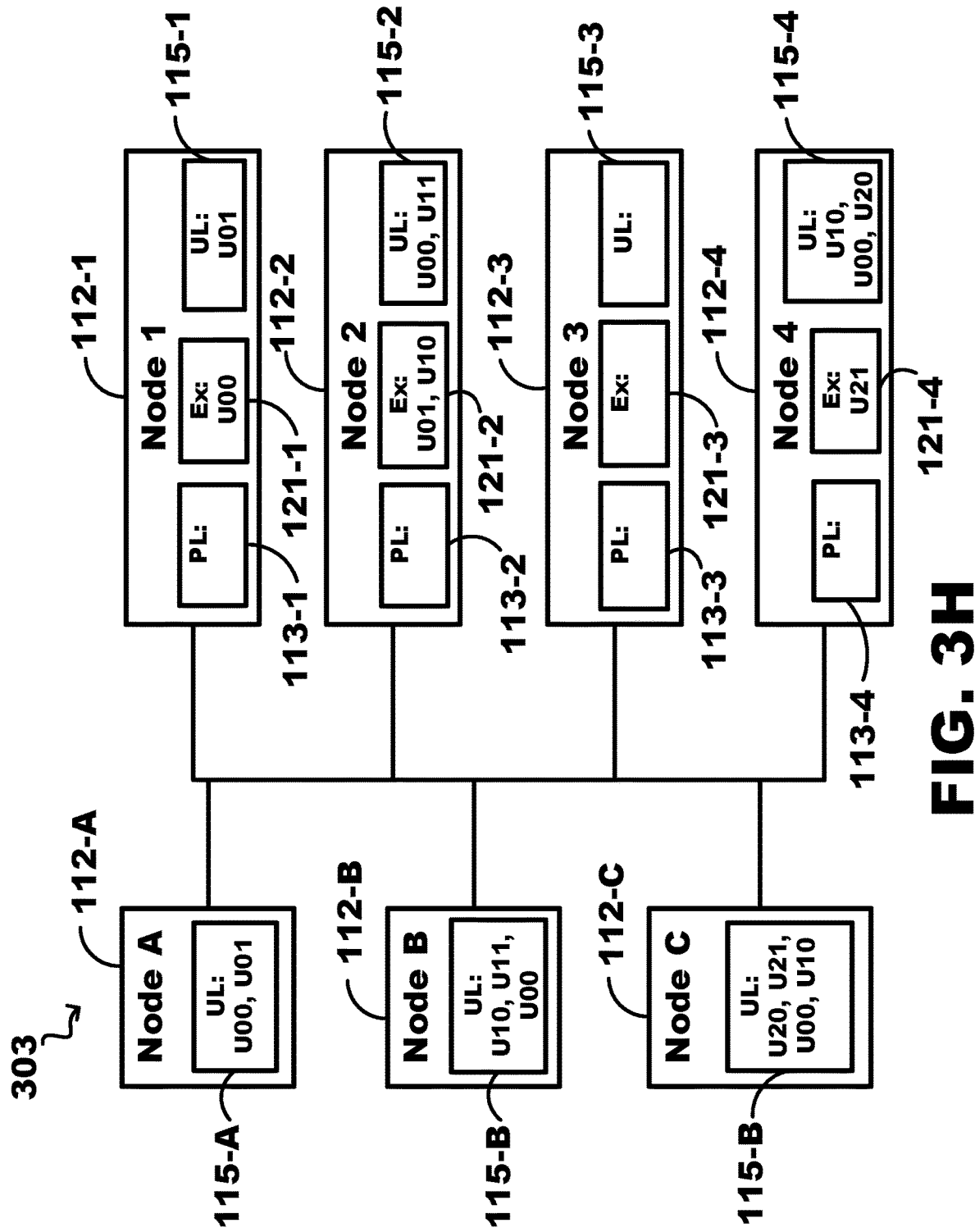
Figure 3I:
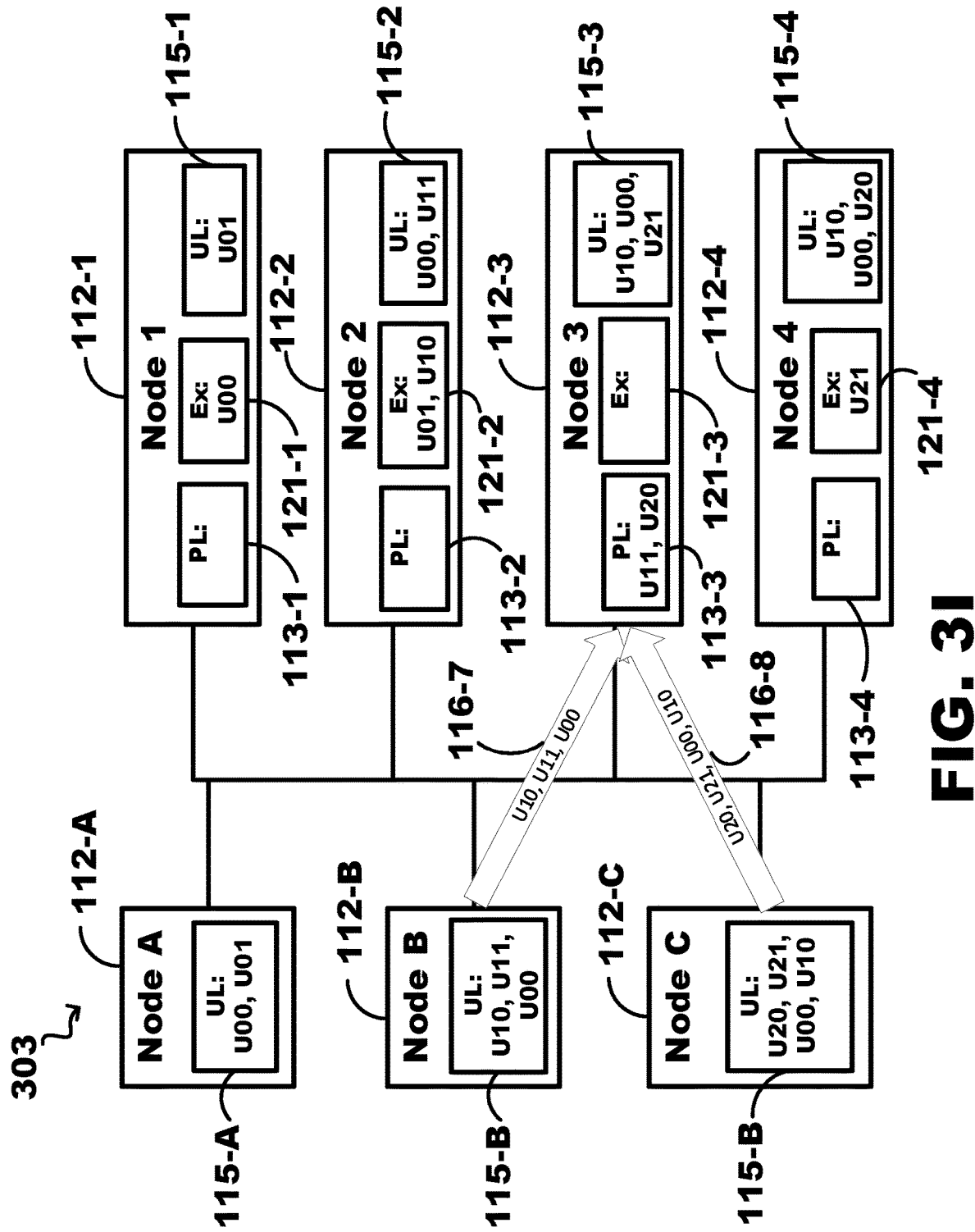

FIGS. 3A-3I are block diagrams of an example system 303 for operations in accordance with embodiments of the present disclosure. The example system 303 is described at particular points during a process of executing operations, storing the operations in pending operations lists and/or unstable lists, and storing the executed operations in non-volatile data storage. As an example, FIG. 3A is an initial starting point during reception of a first set of operations (e.g., updates to operations) to be executed. FIG. 3B is a subsequent point during execution of the operations, and so forth through FIG. 3G. FIG. 3H is an example of a node failure and FIG. 3I is an example of recover of node information lost during the node failure.

The system 303 can include a plurality of nodes such as Node A 112-A, Node B, 112-B, Node C 112-C, Node 1 112-1, Node 2 112-2, Node 3 112-3, . . . , Node 4 112-4. Nodes 1 112-1 to 4 112-4 each include a respective pending operations list ("PL") 113-1 through 113-4 (hereinafter referred to collectively as PL 113) and each of Nodes A 112-A to C 112-C and Nodes 1 112-1 to 4 112-4 include a respective unstable list ("UL") 115-A through 115-4 (hereinafter referred to collectively as UL 115). The PLs 113 include a list of operations that are to be executed on a node. As each operation is executed on a node, the operation is removed from the PL 113. The PLs 113 can indicate an order of the operations to be executed and can be used by the node to designate which operation to perform in which order. In at least one example, and as described in association with the example below, each of the PLs 113 can store different data than other PLs of other nodes. In at least one example, not described in the following example, the PLs of each node can store similar data but would then store operations that the node would not necessarily be executing itself and would need to verify whether that particular node should be executing which operation in the PL. Each of the Nodes 112-1 to 112-4 is illustrated as including an "Ex:" box 121-1 through 121-4 (hereinafter referred to collectively as 121) that indicates which operations (e.g., updates to an operation) have been executed on that respective node, for ease of reference and to aid in description of execution of the operations.

The ULs 115 include a list of operations that are unstable, meaning the operations in the list have not been stored to non-volatile data storage. Subsequent to the operations listed in the ULs 115 being executed on each of the nodes that the operation needs to be executed on, the operation is stored to non-volatile data storage. In response to an operation being stored to the non-volatile data storage, the operation is removed from its corresponding UL 115. Box 115 illustrated within each of Nodes A 112-A to 4 112-4 illustrated in FIGS. 3A-3I indicate which operations are listed in the UL 115 of each corresponding nodes. Each of the ULs 115 indicate which operations (e.g., updates of operations) that the operation executed on its respective node depends on. Each node stores this unstable list of all operations the operations executed within the node depends on in case one of the nodes experiences a failure. In this example, FIG. 3H illustrates Node 112-3 experiencing a node failure and FIG. 3I illustrates how Node 112-3 recovers the lost data due to the node failure. This illustrates how a particular node experiencing a failure uses the PL and UL during and subsequent to the failure.

In this example, as illustrated in FIGS. 3A-3G, Node A 112-A, Node B 112-B, and Node C 112-C are nodes that are sending updates, or operations, to be executed (e.g., operation updates U00 through U21) and Node 1 112-1, Node 2 112-2, Node 3 112-3, and Node 4 112-4 are nodes that are receiving the operations to be executed on those nodes. In at least one embodiment, Nodes A 111-A to C 112-C can be client nodes and Nodes 1 112-1 to N 112-N can be server nodes.

As illustrated in FIG. 3A, each of Nodes A 112-A through 4 112-4 can be in communication with one another, as illustrated by 123. Further, nodes can send operations (such as operation updates) to one another. In this example, Node A 112-A is sending Update 00 (U00) and Update 01 (U01), indicated by arrow 116-1, to Node 1 112-1. As a further example, Node A 112-A can receive a request (MKDIR("a/b") that must be integrated into Node 1 112-1 and Node 2 112-2 (e.g., a first and a second server node). This can be sent as a pair of updates (e.g., U00 and U01 116-1) where a parent directory "a" (e.g., U00) is located on Node 1 112-1 (e.g., a first server).

Initially, each of the nodes receives the updates and determines which updates are to be executed on that node. For example, Node 1 112-1 uses an identity of a node that a particular operation is to be performed on, defined as R.update[i].node. As U00 is being sent (116-1) to Node 1 112-1 to be executed on Node 1 112-1, Node 1 112-1 adds an entry into PL 113-1 including "U00," as illustrated in FIG. 3A, which indicates that U00 should be executed on Node 1 112-1. As U01 is to be updated on Node 2 112-2, Node 1 112-1 does not add U01 into its PL 113-1.

Further, Node 1 112-1 can determine whether there is an operation on which U00 depends that has not been executed yet, defined as R0.update[i].ready( ) (which would be "true" when U00 depends on either no operations or no operations that have not been executed yet and "false" when U00 depends on a non-executed operation). Node 1 112-1, in response to R0.update[0].ready( ) being true, can execute U00 by performing R0.update[0].apply( ). In response to Node 1 112-1 executing U00, U00 is removed from PL 113-1 (as illustrated in FIG. 3B). Further, Node 1 112-1 sends a reply to Node A 112-A including operations within UL 115-1, which at this point is empty so no operations are sent in reply. As Node A 112-A sends U00 and U01, Node A 112-A adds U00 and U01 to its own UL 115-A in order to monitor which operations Node A 112-A sends to other nodes to be executed and that are not yet stable (e.g., not stored in non-volatile memory). Node 1 112-1 then adds U01 to its UL 115-1 as it was sent with U00 but not executed on Node 1 112-1.

As illustrated in FIG. 3B, the executed box 121-1 of Node 1 112-1 includes U00 as U00 has been executed on Node 1 112-1 (as described in FIG. 3A). Node A 112-A is sending U00 and U01, indicated by arrow 116-2, to Node 2 112. As a further example, the request (MKDIR("a/b") received by Node A 112-A can be integrated into Node 2 112-2 by creating a new sub-directory "b" (e.g., U01) and sending this operation (e.g., update of operation U01) to Node 2 112-2 (e.g., to a second server). Initially, Node 2 112-2 receives U00 and U01 and determines which updates are to be executed on that node. For example, Node 2 112-2 uses an identity of a node that a particular operation is to be performed on, defined as R.update[i].node (R.update[0].node, in this case). As U01 is being sent (116-2) to Node 2 112-2 to be executed on Node 2 112-2, Node 2 112-2 adds an entry into PL 113-2 including "U01," as illustrated in FIG. 3B, which indicates that U01 should be executed on Node 2 112-2. As U00 is to be (and was executed, as described in association with FIG. 3A) updated on Node 1 112-1, Node 2 112-2 does not add U00 into its PL 113-2.

Further, Node 2 112-2 can determine whether there is an operation on which U01 depends that has not been executed yet, defined as R0.update[1].ready( ) (which would be "true" when U01 depends on either no operations or no operations that have not been executed yet and "false" when U01 depends on a non-executed operation). As U01 depends on U00, but U00 has been executed, R0.update[1].ready( ) would indicate a "true." Node 2 112-2, in response to R0.update[1].ready( ) being true, can execute U01 by performing R0.update[1].apply( ). In response to Node 2 112-2 executing U01, U01 is removed from PL 113-2 (as illustrated in FIG. 3C). Further, Node 2 112-2 sends a reply to Node A 112-A including operations within UL 115-2, which at this point is empty so no operations are sent in reply to Node B 112-B. As U00 depends on U01 as they are part of a pair of the same operation, U00 is added as an entry into the UL 115-2 of Node 2 112-2, indicating that U01 depends on U00.

As illustrated in FIG. 3C, the executed box 121-2 of Node 2 112-2 includes U01 as U01 has been executed on Node 2

112-2 (as described in FIG. 3B). Further, Node B 112-B is sending Update 10 (U10) and Update 11 (U11), indicated by arrow 116-3, to Node 2 112-2. As a further example, Node B 112-B can receive a request (MKDIR("a/b/c")) that must be integrated to Node 2 112-2 and Node 3 112-3 (e.g., the second and a third server node). This can be sent as a pair of updates (e.g., U10, to be executed on Node 2 112-2, and U11, to be executed on Node 3 112-3). As Node B 112-B sends U10 and U11, Node B 112-B adds U10 and U11 (with U00 illustrated in parenthesis as it is to be added at the end of the description of FIG. 3C) to its own UL 115-B in order to monitor which operations Node B 112-B sends to other nodes to be executed and that are not yet stable (e.g., not stored in non-volatile memory).

Node 2 112-2 uses an identity of a node that a particular operation is to be performed on, defined as R.update[2].node. As U10 is being sent (116-3) to Node 2 112-2 to be executed on Node 2 112-2, Node 2 112-2 adds an entry into PL 113-2 including "U10," as illustrated in FIG. 3C, which indicates that U10 should be executed on Node 2 112-2.

Further, Node 2 112-2 can determine whether there is an operation on which U10 depends that has not been executed yet, defined as R0.update[2].ready( ) (which would be "true" when U10 depends on either no operations or no operations that have not been executed yet and "false" when U10 depends on a non-executed operation). As U10 depends on U00, but U00 has been executed, R0.update[2].ready( ) would indicate a "true." Node 2 112-2, in response to R0.update[2].ready( ) being true, can execute U10 by performing R0.update[2].apply( ). In response to Node 2 112-2 executing U10, U10 is removed from PL 113-2 (as illustrated in FIG. 3D).

Further, Node 2 112-2 sends a reply to Node B 112-B including operations within UL 115-2, which in this example includes U00. Node B 112-B then adds U00 to its UL 115-B (indicated by the U00 in parentheses, where parentheses indicate that U00 was not in UL 115-B at the beginning of the process illustrated in FIG. 3C but is present at the end of the process illustrated). As U11 depends on U10 (as they are sent as a pair of a same operation), U11 is added as an entry into the UL 115-2 of Node 2 112-2, indicating that U10 depends on U11 (resulting in UL 115-2 including [U00, U11]).

As illustrated in FIG. 3D, the executed box 121-2 of Node 2 112-2 includes U01 and U10 as U01 and U10 have both been executed on Node 2 112-2 (as described in FIGS. 3B and 3C). Further, Node B 112-B is sending Update 10 (U10), Update 11 (U11), and Update 00 (U00), which was sent back as a reply from Node 2 112-2 to Node B 112-B, indicating that an operation on Node 2 112-2 depended on U00) indicated by arrow 116-4, to Node 3 112-3.

Node 3 112-3 uses an identity of a node that a particular operation is to be performed on, defined as R.update[3].node. As U11 is being sent (116-4) to Node 3 112-3 to be executed on Node 3 112-3, Node 3 112-3 adds an entry into PL 113-3 including "U11," as illustrated in FIG. 3D, which indicates that U11 should be executed on Node 3 112-3. U10 and U00 are not added to PL 113-3 as they are not to be executed on Node 3 112-3.

Further, Node 3 112-3 can determine whether there is an operation on which U11 depends that has not been executed yet, defined as R0.update[3].ready( ) (which would be "true" when U11 depends on either no operations or no operations that have not been executed yet and "false" when U11 depends on a non-executed operation). As U11 depends on U10, but U10 has been executed, R0.update[3].ready( ) would indicate a "true." Node 3 112-3, in response to R0.update[3].ready( ) being true, can execute U11 by performing R0.update[3].apply( ). In response to Node 3 112-3 executing U11, U11 is removed from PL 113-3 (as illustrated in FIG. 3E).

Further, Node 3 112-3 sends a reply to Node B 112-B including operations within UL 115-3, which, at this point, is empty so no operations are sent in reply to Node B 112-B. As U10 is part of a same operation as U11, U10 is added as an entry into the UL 115-3 of Node 3 112-3, indicating that U11 depends on U10. As U00 was also sent by Node B 112-B as U10 depends on U00, U00 is also added to UL 115-3 resulting in UL 115-3 including [U00, U11]).

As illustrated in FIG. 3E, the executed box 121-3 of Node 3 112-3 includes U11 indicating that U11 has been executed on Node 3 112-3 (as described in FIG. 3E). Further, Node C 112-C is sending Update 20 (U20) and Update 21 (U21). U00 and U10 are illustrated in parenthesis as they will be added by the end of the operations described in association with FIG. 3E but are not in UL 115-B when the updates are sent to Node 3 112-3. As an example, Node C 112-C can receive a request (MKDIR("a/b/c/d")) that must be integrated to Node 3 112-3 and Node 4 112-4 (e.g., the third server node and a fourth server node). This can be sent as a pair of updates (e.g., U20 and U21).

Node 3 112-3 uses an identity of a node that a particular operation is to be performed on, defined as R.update[4].node. As U20 is being sent (116-5) to Node 3 112-3 to be executed on Node 3 112-3, Node 3 112-3 adds an entry into PL 113-3 including "U20," as illustrated in FIG. 3E, which indicates that U20 should be executed on Node 3 112-3.

Further, Node 3 112-3 can determine whether there is an operation on which U20 depends that has not been executed yet, defined as R0.update[4].ready( ) (which would be "true" when U20 depends on either no operations or no operations that have not been executed yet and "false" when U20 depends on a non-executed operation). As U20 depends on U10, and U10 depends on U00 (but U10 and U00 have both been executed), R0.update[4].ready( ) would indicate a "true." Node 3 112-3, in response to R0.update[4].ready( ) being true, can execute U20 by performing R0.update[4].apply( ). In response to Node 3 112-3 executing U20, U20 is removed from PL 113-3 (as illustrated in FIG. 3F).

Further, Node 3 112-3 sends a reply to Node C 112-C including operations within UL 115-3, which, at this point, includes [U00, U10]. Therefore, UL 115-C of Node C 112-C now includes [U20, U21, U00, U10]. As U21 depends on U20 (as they are sent as a pair of a same operation), U21 is added as an entry into the UL 115-3 of Node 3 112-3, indicating that U21 depends on U20. As U21 is part of a same operation as U20, U21 is added as an entry into the UL 115-3 of Node 3 112-3, indicating that U21 depends on U20, resulting in UL 115-3 including [U00, U10, U21].

As illustrated in FIG. 3F, the executed box 121-3 of Node 3 112-3 includes U20 (along with U11) indicating that U20 has been executed on Node 3 112-3 (as described in FIG. 3E). Further, Node C 112-C is sending Update 20 (U20) and Update 21 (U21), along with U00 and U10 (added to UL 115-C in association with the description of FIG. 3E).

Node 4 112-4 uses an identity of a node that a particular operation is to be performed on, defined as R.update[4].node. As U21 is being sent (116-6) to Node 4 112-4 to be executed on Node 4 112-4, Node 4 112-4 adds an entry into PL 113-4 including "U21," as illustrated in FIG. 3F, which indicates that U21 should be executed on Node 4 112-4.

Further, Node 4 112-4 can determine whether there is an operation on which U21 depends that has not been executed yet, defined as R0.update[5].ready( ) (which would be "true"

when U21 depends on either no operations or no operations that have not been executed yet and "false" when U21 depends on a non-executed operation). As U21 does not depend on a non-executed operation, R0.update[5].ready( ) would indicate a "true." Node 4 112-4, in response to R0.update[5].ready( ) being true, can execute U21 by performing R0.update[5].apply( ). In response to Node 4 112-4 executing U21, U21 is removed from PL 113-4 (as illustrated in FIG. 3G).

Further, Node 4 112-4 sends a reply to Node C 112-C with operations listed in UL 115-4, indicating the operations that are within UL 115-4, which, at this point, is empty so no operations are sent in reply to Node C 112-C. As U21 is part of a same operation as U20, U20 is added as an entry into the UL 115-4 of Node 4 112-4, indicating that U20 depends on U21. And since U00 and U10 were sent due to U20 depending on U10 which depends on U00, U10 and U00 are also added to UL 115-4.

As illustrated in FIG. 3G, the executed box 121-4 of Node 4 112-4 includes U21 indicating that U21 has been executed on Node 4 112-4 (as described in FIG. 3F). Further, at this point, executed box 121-1 of Node 1 112-1 includes U00, executed box 121-2 of Node 2 112-2 includes U01 and U10, and executed box 121-3 of Node 3 112-3 includes U11 and U20. This indicates that all of U00, U01, U10, U11, U20, and U21 have been executed in each of their respective nodes.

FIG. 3H illustrates an example of a node failure experienced by Node 3 112-3. As illustrated in FIG. 3H, the PL 113-3, the executed box 121-3, and the UL 115-3 have all been cleared (e.g., data has been lost) due to the node failure. This can be due to the data in Node 3 112-3 being stored in volatile memory and the node failure losing all data stored in volatile memory. As the data stored in PL 113-3 and UL 115-3 have not been stored in non-volatile memory, the data is still unstable data.

As illustrated in FIG. 3I, Node 3 112-3 can recover the lost data by communicating with the other nodes, such as Node B 112-B and Node C 112-C. As an example, Node B 112-B can send the data in its UL 115-B (including [U10, U11, and U00]) to Node 3 112-3. Node 3 112-3 can perform the operations described above in association with FIGS. 3A-3F. For example, Node 3 112-3 can determine which of the operations are to be executed on Node 3 112-3 and then repopulate its PL 113-3 with those operations, e.g., U11 in this case as that is the operation to be executed on Node 3 112-3. Since UL 115-3 is empty at this point, Node 3 112-3 would not reply back to Node B 112-B with any operations. Operations U10 and U00 can be added into the UL 115-3 as operations that are dependent on, directly or indirectly, by U11.

Further, Node C 112-C can send the data in its UL 115-C, including U20, U21, U00, and U10 to Node 3 112-3. Node 3 112-3 can determine which of those operations to be executed on Node 3 112-3, e.g., U20. Node 3 112-3 can reply with the data in its UL 115-3 which would include U10 and U00 from the step above (but since UL 115-B already includes these operations, no change would be made). Node 3 112-3 can enter the other received operations, e.g., U21, U00, and U10 into its UL 115-3 (which already includes U00 and U10 so only U21 would be added at this point). Node 3 112-3 can execute U11 and U20 and remove them from the PL 113-3. At this point, the executed box 121-3 would include U11 and U20 as these are now executed. Node 3 112-3 would now be as it is illustrated in FIG. 3F, prior to Node 3 112-3 experiencing the node failure. In this way, only a redoing of operations would need to be performed in response to a node failure in contrast to removing and/or deleting any operations.

Each of the operations U00, U01, U11, U20, and U21 are listed in the ULs 115-A to 115-4 as these operations are still stored in volatile memory and may be lost if a respective node experiences a node failure. As each of the operations are stored in non-volatile memory, that corresponding operation can be removed from the UL lists. Using FIG. 3I as a reference, as an example, in response to U01 being stored in non-volatile memory, "U01" can be removed from UL 115-1 and UL 115-A. Likewise, in response to U11 being stored in non-volatile memory, "U11" can be removed from UL 115-2 and UL 115-B. Likewise, each of U00, U10, U20, and U21 can be removed from their respective ULs when they are stored in non-volatile memory. In response to all of the operations in this example (e.g., U00, U01, U10, U11, U20, and U21) being stored in non-volatile memory, each of the unstable lists (ULs) 115 would be empty. In the case of a node failure, all operations, in this example, would be retained as they would have all been persistently stored in non-volatile memory.

While this example shows a finite number of operations at a start of the example and a same finite number at completion of the example, examples are not so limited. As an example, after several operations have been executed (e.g., U00 and U01), additional operations to be updated may be sent to the nodes. In this case, the pending operations list would grow to include those received operations and the unstable list would also grow. As an operation is received at the node, the operation to be executed on that node can be added to the pending operations list and operations that the operations to be executed on the node depend on can be added to the node's unstable list. To be removed from the pending operations list, the operation would need to be executed. To be removed from the unstable list, the operation would need to be stored in non-volatile data storage. In this way, the pending operations list and the unstable list expands and contracts as execution and storage occurs and as additional operations are received to be executed. This allows the system to be flexible and to react to operation changes while still only redoing lost operations and not needing to delete any operations. As long as the dependencies are monitored and no operation is executed whose operation it depends on still has an operation to execute, the process continues to move forward regardless of what operation is received and which operations are executed and stored persistently.

Further, while 3 nodes are illustrated that send the operations to be executed and 4 nodes are illustrated to receive and execute the operations, examples are not so limited. Any number of nodes, beyond that of Node C 112-C for sending nodes and Node 4 112-4 for receiving nodes, can be sending the operations and/or can be receiving and executing the operations. In addition, the number of nodes can also expand and contract based on which operations have been executed and which operations are yet to be executed. In this way, the system as a whole can expand and contract based on which data is being received and processed.

Figure 4:
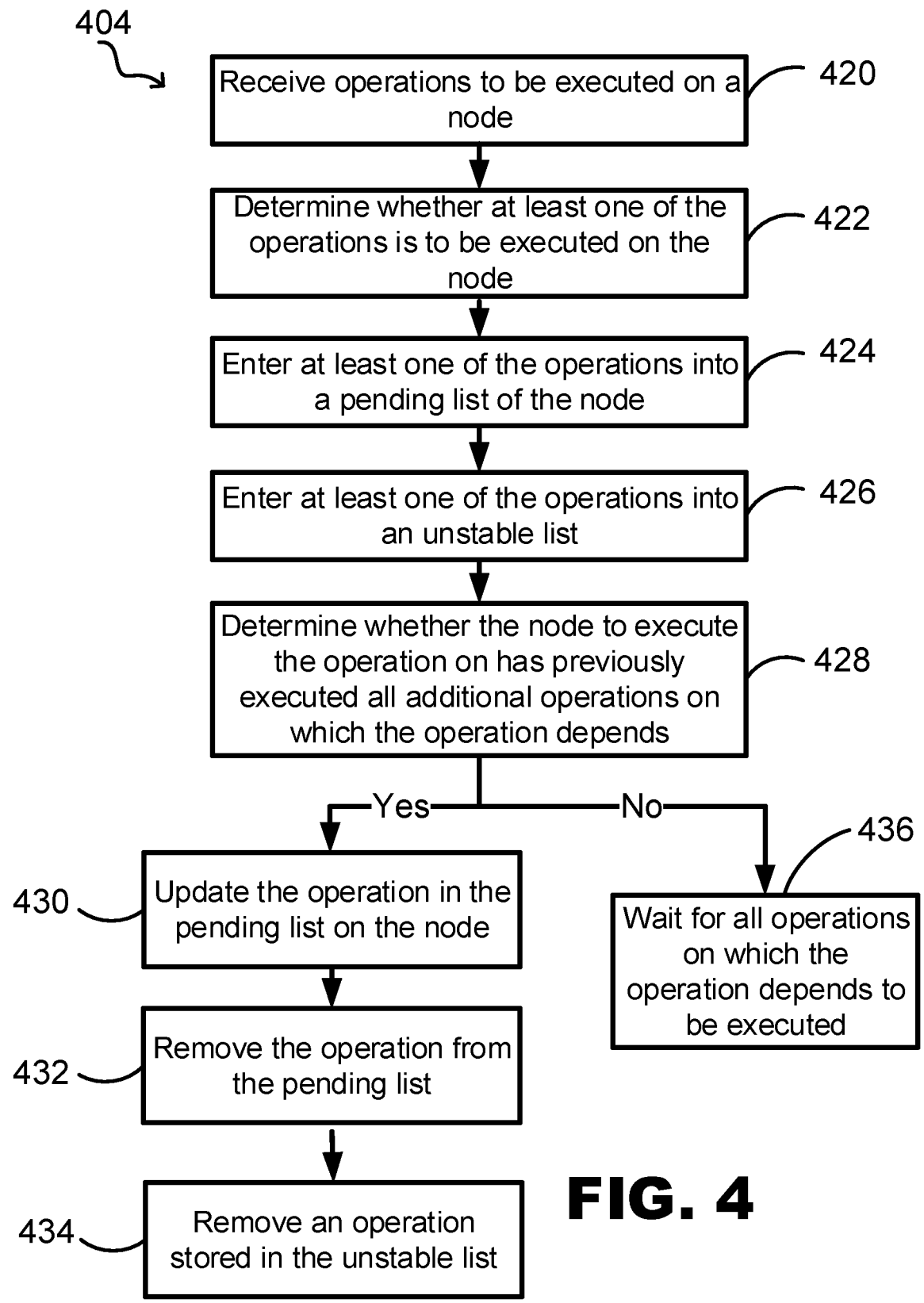
FIG. 4 is a flowchart of an example method of executing operations in accordance with embodiments of the present disclosure.

FIG. 4 is a flowchart of an example method 404 of executing operations in accordance with embodiments of the present disclosure. The method 404 can include receiving operations to be executed on a node 420. The method 404 can include determining whether at least one of the operations is to be executed on the node 422. The process to determine this can be referred to as R.update[i].node and can indicate which node to execute the operation on. The method 404 can include entering at least one of the operations into a pending operations list of the node 424. The pending operations list can indicate which operations have not yet been executed. The method 404 can include entering at least one of the operations into an unstable list 426. The received operation entered into the unstable list can be an operation on which the operation entered into the pending operations list is dependent upon. The unstable list can indicate which of the operations has not been stored in non-volatile data storage.

The method 404 can include determining whether the node to execute the operation on has previously executed all additional operations on which the operation depends 428. The method 404 can include updating the operation in the pending operations list on the node 430. In at least one example, the operation can be updated on the node in response to R.update[i].node indicating that the node that received the operation should execute the operation and in response to determining that all the additional operations on which the operation depends has been executed. In response to determining that the node that received the operation should execute the operation and in response to determining that all the additional operations on which the operation depends has not been executed, the method 404 can include waiting for all operations on which the operation depends to be executed 436.

The method 404 can include removing the operation from the pending operations list 432. In at least one example, the operation can be removed from the pending operations list in response to updating the operation on the node. The method 404 can include removing an operation from the unstable list 434 in response to the operation being stored in non-volatile data storage.

Figure 5:
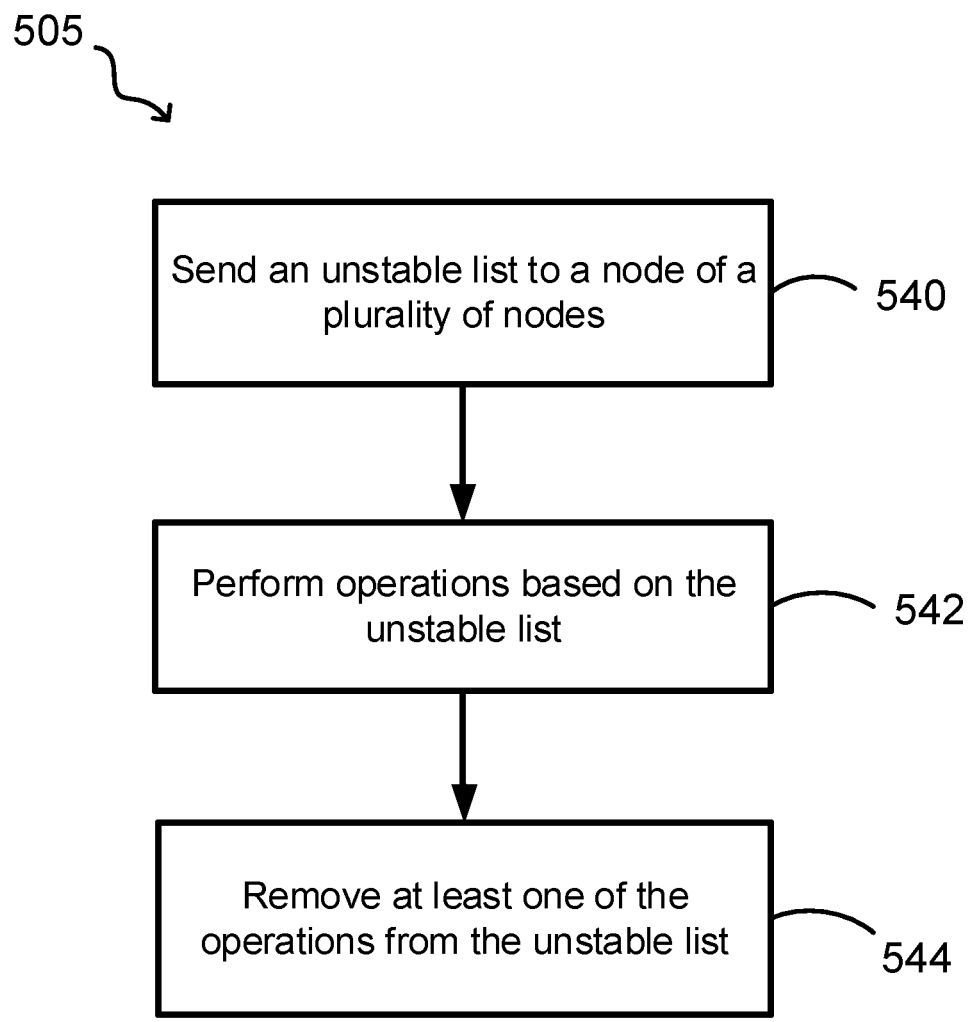
FIG. 5 is a flowchart of an example method of executing operations in accordance with embodiments of the present disclosure.

FIG. 5 is a flowchart of an example method 505 of executing operations in accordance with embodiments of the present disclosure. The method 505 can include sending an unstable list to a node of a plurality of nodes 540. The unstable list can be sent to the node in response to the node experiencing a node failure. The node failure can cause the node to lose data previously stored as the unstable list. The unstable list can be repopulated with the previous data based on the received unstable list. The unstable list of the node can be used to repopulate a pending operations list which indicates which operations the node should execute. The unstable list can indicate a number of dependencies of each of the operations.

The method 505 can include performing operations based on the unstable list 542. The pending operations list can be repopulated by the unstable list and used to indicate which operations to execute. The node can perform the operations be selecting operations from the pending operations list and the unstable list. The dependencies indicated by the unstable list can be used by the node to determine which of the operations to executed. As an example, a determination of whether a first operation should be executed can be based on whether all operations of transactions that the first operation depends on has been executed. If at least one operation that the first operation depends on has not been executed, the node can wait until this at least one operation has been executed. In this way, before an operation can be executed, all of the operations of transactions on which it depends has to be executed.

The method 505 can include removing at least one of the operations from the unstable list 544. In response to execution of the operations, the operations can be stored in non-volatile data storage. In response to the operations being stored in the non-volatile data storage, the operations can be removed from the unstable list.

Thus, various embodiments of NODE MANAGEMENT OF PENDING AND UNSTABLE OPERATIONS are disclosed. Although reference is made herein to the accompanying set of drawings that form part of this disclosure, one of at least ordinary skill in the art will appreciate that various adaptations and modifications of the embodiments described herein are within, or do not depart from, the scope and spirit of this disclosure. For example, aspects of the embodiments described herein may be combined in a variety of ways with each other. Therefore, it is to be understood that, within the scope of the appended claims, the claimed invention may be practiced other than as explicitly described herein.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a," "an," and "the" encompass embodiments having plural referents, unless the content clearly dictates otherwise. As used in this specification and the appended claims, the term "or" is generally employed in its non-exclusive sense meaning "and/or" unless the content clearly dictates otherwise.

As used herein, "have," "having," "include," "including," "comprise," "comprising" or the like are used in their open ended sense, and generally mean "including, but not limited to". It will be understood that "consisting essentially of," "consisting of" and the like are subsumed in "comprising," and the like.

The phrases "at least one of," "comprises at least one of," and "one or more of" followed by a list refers to any one of the items in the list and any combination of two or more items in the list.

What is claimed is:

1. A system, comprising:
a plurality of nodes, each comprising:
    a pending operations list comprising operations that have not yet been executed on the node;
    an unstable operations list comprising operations that have not yet been stored on non-volatile data storage, each of the operations listed in the unstable operations list comprising a listing of all other operations that must be executed prior to the operation being executed on each respective node; and a hardware controller comprising one or more processors configured to:
  execute at least one operation listed in the pending operations list in response to all other operations that the operation depends on being executed;
  remove the executed operation from the pending operations list in response to execution of the operation;
  remove at least one operation from the unstable operations list in response to storage of the operation from the unstable operations list on non-volatile data storage; and
  in response to an additional operation of all other operations that a second additional operation listed in the pending operations list depends on not being executed, delay execution of the second additional operation until the additional operation is executed.

2. The system of claim 1, wherein the hardware controller is further configured to, in response to the storage of the operation on the non-volatile data storage, remove the operation from the listing of all other operations that must be executed prior to the operation being executed.

3. The system of claim 1, wherein a first node of the plurality of nodes is configured to receive data from an unstable operations list of a second node of the plurality of nodes in response to the first node experiencing a node failure.

4. The system of claim 3, wherein the first node experiencing the failure comprises the first node losing data stored in the unstable operations list and the pending operations list of the first node.

5. The system of claim 3, wherein the hardware controller of the second node of the plurality of nodes is configured to send the unstable operations list of the second node to the first node in response to the first node experiencing the node failure.

6. The system of claim 1, wherein each of the hardware controllers is further configured to not delete an executed operation in response to one of the plurality of nodes experiencing a node failure.

7. The system of claim 1, wherein each of the hardware controllers of the plurality of nodes are configured to, in response to the storage of the operation on the non-volatile data storage, send a notification to all other nodes of the plurality of nodes indicating the storage.

8. A method, comprising:
providing a pending operations list comprising operations that have not yet been executed on a network node; and
providing an unstable operations list comprising operations that have not yet been stored on non-volatile data storage, each of the operations listed in the unstable operations list comprising a listing of all other operations that must be executed prior to the operation being executed on each respective node;
in response to a first node of a plurality of nodes experiencing node failure, a hardware controller of the first node receiving data from the unstable operations list of a second node of the plurality of nodes; and
the hardware controller of the first node repopulating the pending operations list of the first node with the data from the unstable operations list of the second node.

9. The method of claim 8, comprising, in response to the second node experiencing a node failure, the hardware controller of the first node sending data from the first node's unstable operations list to the second node.

10. The method of claim 8, comprising, in response to completion of an operation on each of the plurality of nodes, each of the hardware controllers of the plurality of nodes sending a notification to all other nodes of the plurality of nodes indicating the completion.

11. The method of claim 8, comprising removing an executed operation from the pending operations list in response to execution of the executed operation.

12. The method of claim 8, comprising removing an executed operation from the unstable operations list in response to storage of the executed operation on non-volatile data storage.

13. An apparatus, comprising:
a plurality of nodes, each comprising:
  a pending operations list comprising operations that have not yet been executed on the node;
  an unstable operations list comprising operations that have not yet been stored on non-volatile data storage, each of the operations listed in the unstable operations list comprising a listing of all other operations that must be executed prior to the operation being executed;
  a first node controller configured to:
    store an unstable operations list indicating which operations have not been stored in non-volatile memory; and
    send the operations in the unstable operations list to a second node of the plurality of nodes that has failed; and
  a second node controller configured to:
    receive the operations from the unstable operations list of the first node; and
    store the operations in the pending operations list of the second node.

14. The apparatus of claim 13, wherein the second node controller is further configured to determine which operations in the pending operations list of the second node to execute first, wherein the first-to-execute operation does not depend on a transaction that has a pending operation yet to be executed.

15. The apparatus of claim 13, wherein the second node controller is further configured to determine which operation in the pending operations list of the second node to execute second, wherein the second operation to be executed does not depend on a transaction that has a pending operation yet to be executed.

16. The apparatus of claim 15, wherein the second operation depends on a first operation, and wherein the second operation is executed in response to the first operation being executed.

17. The apparatus of claim 13, wherein none of the operations are deleted once the operations are executed.

18. The apparatus of claim 13, wherein the second node controller is further configured to, in response to receiving the operations from the first node, repopulate the unstable operations list in the second node with the received operations on which operations to be executed on the second node depend.

19. The apparatus of claim 18, wherein, in response to an operation being stored in non-volatile data storage, the corresponding node controller is configured to remove the stored operation from the unstable operations list.

20. A system, comprising:
a plurality of nodes, each comprising:
  a pending operations list comprising operations that have not yet been executed on the node;

an unstable operations list comprising operations that have not yet been stored on non-volatile data storage, each of the operations listed in the unstable operations list comprising a listing of all other operations that must be executed prior to the operation being executed on each respective node; and a hardware controller comprising one or more processors configured to:

execute at least one operation listed in the pending operations list in response to all other operations that the operation depends on being executed;

remove the executed operation from the pending operations list in response to execution of the operation; and remove at least one operation from the unstable operations list in response to storage of the operation from the unstable operations list on non-volatile data storage, wherein a first node of the plurality of nodes is configured to receive data from an unstable operations list of a second node of the plurality of nodes in response to the first node experiencing a node failure.

21. The system of claim 20, wherein the hardware controller is further configured to, in response to the storage of the operation on the non-volatile data storage, remove the operation from the listing of all other operations that must be executed prior to the operation being executed.

22. The system of claim 20, wherein the first node experiencing the failure comprises the first node losing data stored in the unstable operations list and the pending operations list of the first node.

23. The system of claim 20, wherein the hardware controller of the second node of the plurality of nodes is configured to send the unstable operations list of the second node to the first node in response to the first node experiencing the node failure.

24. The system of claim 20, wherein each of the hardware controllers is further configured to not delete an executed operation in response to one of the plurality of nodes experiencing a node failure.

25. The system of claim 20, wherein each of the hardware controllers of the plurality of nodes are configured to, in response to the storage of the operation on the non-volatile data storage, send a notification to all other nodes of the plurality of nodes indicating the storage.

26. A system, comprising:

a plurality of nodes, each comprising:

a pending operations list comprising operations that have not yet been executed on the node;

an unstable operations list comprising operations that have not yet been stored on non-volatile data storage, each of the operations listed in the unstable operations list comprising a listing of all other operations that must be executed prior to the operation being executed on each respective node; and a hardware controller comprising one or more processors configured to:

execute at least one operation listed in the pending operations list in response to all other operations that the operation depends on being executed;

remove the executed operation from the pending operations list in response to execution of the operation;

remove at least one operation from the unstable operations list in response to storage of the operation from the unstable operations list on non-volatile data storage; and not delete an executed operation in response to one of the plurality of nodes experiencing a node failure.

27. The system of claim 26, wherein the hardware controller is further configured to, in response to the storage of the operation on the non-volatile data storage, remove the operation from the listing of all other operations that must be executed prior to the operation being executed.

28. The system of claim 26, wherein each of the hardware controllers of the plurality of nodes are configured to, in response to the storage of the operation on the non-volatile data storage, send a notification to all other nodes of the plurality of nodes indicating the storage.

29. A system, comprising:

a plurality of nodes, each comprising:

a pending operations list comprising operations that have not yet been executed on the node;

an unstable operations list comprising operations that have not yet been stored on non-volatile data storage, each of the operations listed in the unstable operations list comprising a listing of all other operations that must be executed prior to the operation being executed on each respective node; and a hardware controller comprising one or more processors configured to:

execute at least one operation listed in the pending operations list in response to all other operations that the operation depends on being executed;

remove the executed operation from the pending operations list in response to execution of the operation; and remove at least one operation from the unstable operations list in response to storage of the operation from the unstable operations list on non-volatile data storage, wherein each of the hardware controllers of the plurality of nodes are configured to, in response to the storage of the operation on the non-volatile data storage, send a notification to all other nodes of the plurality of nodes indicating the storage.

30. The system of claim 29, wherein the hardware controller is further configured to, in response to the storage of the operation on the non-volatile data storage, remove the operation from the listing of all other operations that must be executed prior to the operation being executed.

* * * * *